United States Patent
Kalker et al.

(10) Patent No.: US 6,714,658 B2
(45) Date of Patent: *Mar. 30, 2004

(54) DETECTION OF AUXILIARY DATA IN AN INFORMATION SIGNAL

(75) Inventors: Antonius Adrianus Cornelis Maria Kalker, Eindhoven (NL); Jaap Andre Haitsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/409,436

(22) Filed: Apr. 8, 2003

(65) Prior Publication Data

US 2003/0190055 A1 Oct. 9, 2003

Related U.S. Application Data

(63) Continuation of application No. 09/806,796, filed as application No. PCT/EP00/07188 on Jul. 26, 2000, now Pat. No. 6,577,747.

(30) Foreign Application Priority Data

Aug. 5, 1999 (EP) .............................. 99202582
Jun. 15, 2000 (EP) .............................. 00202079

(51) Int. Cl.$^7$ ................................ H04K 1/00
(52) U.S. Cl. ...................... 382/100; 382/278
(58) Field of Search ................. 382/100, 232, 382/216, 278; 380/210, 252, 287, 54; 713/176

(56) References Cited

U.S. PATENT DOCUMENTS 5,835,639 A * 11/1998 Honsinger et al. .......... 382/278
5,933,798 A * 8/1999 Linnartz ..................... 702/191
6,263,086 B1 * 7/2001 Wang ......................... 382/100

FOREIGN PATENT DOCUMENTS

| EP | 0 901 102 A2 * | 3/1999 | ............. G06T/1/00 |
| WO | WO 99/45705 A2 | 9/1999 | ........... H04N/5/913 |
| WO | WO 99/45706 A2 | 9/1999 | ........... H04N/5/913 |
| WO | WO99/45707 A2 | 9/1999 | ........... H04N/5/913 |

OTHER PUBLICATIONS

Lu et al., "Highly Robust Image Watermarking Using Complementary Modulations," *Proc. 2$^{nd}$ Int. Workshop on Information Security*, LNCS vol. 1729, Nov. 1999, pp. 136–153.*

Maes et al., "Exploiting Shift Invariance to Obtain a High Payload in Digital Image Watermarking," *Proc. IEEE Int. Conf. on Multimedia Computing and Systems*, Jun. 1999, pp. 7–12.*

Kalker et al., "A Video Watermarking System for Broadcast Monitoring," *Proc. SPIE vol. 3657: Security and Watermarking of Multimedia Contents*, Jan. 1999, pp. 103–112.*

* cited by examiner

*Primary Examiner*—Andrew W. Johns

(57) ABSTRACT

Data is hidden in an information signal by encoding payload in to relative positions and/or polarities of multiple (possibly equal) embedded watermarks. The payload is retrieved by computing the correlation between the watermark(s) and the signal as a function of the position. The distance between peaks of the correlation function represents the payload. In order to precisely detect said distance, even if the peaks are smeared, the correlation function in a window ($w_1$) around one peak ($p_1$) is compared with the correlation function in a similar window ($w_2$) around another peak ($p_2$). This is done for different positions of said windows. The distance (k) between the windows (37,38) for which the correlation functions most resemble each other is the distance representing the payload.

13 Claims, 5 Drawing Sheets

DETECTION OF AUXILIARY DATA IN AN INFORMATION SIGNAL

This application is a continuation of application Ser. No. 09/806,796, filed Apr. 4, 2001, now U.S. Pat. No. 6,577,747, which is the national stage of International Application PCT/EP00/07188, filed Jul. 26, 2000, now published as WO 01/11563.

FIELD OF THE INVENTION

The invention relates to a method and arrangement for detecting payload data encoded into relative positions and/or relative polarities of watermarks embedded in an information signal.

BACKGROUND OF THE INVENTION

International Patent Application WO-A-99/45705 discloses a method of detecting multi-bit payload data in an information signal. The payload is encoded into the relative positions and polarities of multiple (possibly equal) embedded watermark patterns. The prior-art detection method comprises computing the correlation of the embedded watermark patterns and the information signal as a function of the position of the watermark patterns with respect to the signal. This computing step yields a correlation function in which the positions and polarities of the embedded watermark patterns are represented by large positive or negative peaks. The relative distance between, and the signs of, the peaks represent the payload data.

In the ideal case, the peaks of the correlation function resemble Dirac-pulses and their positions can be determined with sufficient precision. However, in many practical situations the positions and the polarities are not so well defined. This is particularly the case if the signal has been subjected to processing. Video processing, for example, causes the correlation peaks to be smeared. Peaks are broadened, so that the central position is no longer well defined. Even the sign of a peak may be incorrectly retrieved due to large negative side lobs.

As a solution to this problem, WO-A-99/45705 teaches restriction of allowed peak positions to a sub-grid of all possible positions. Peak jitter is then resolved by quantizing to the nearest sub-grid point. However, the payload capacity of the watermark is thereby reduced. Moreover, it does not solve the inversion of peak polarity.

OBJECT AND SUMMARY OF THE INVENTION

It is an object of the invention to provide an improved method and arrangement for detecting the distance between multiple watermark patterns embedded in an information signal. It is also an object of the invention to provide an improved method and arrangement for detecting the relative polarities of said watermark patterns.

To this end, the step of determining the relative positions of peaks comprises computing the resemblance of the correlation function in a window around one of said peaks to the correlation function in a window around another one of said peaks for a plurality of positions of at least one of said windows, and determining the positions of said windows for which said resemblance has an extreme value.

The invention is based on the recognition that if peaks of a correlation function are smeared, they are all smeared in the same manner. The correlation functions (the waveforms) in the neighborhoods of peaks resemble each other to a large extent. The invention exploits this property by identifying the neighborhoods in which the correlation functions resemble each other most, and determining the distance between the identified neighborhoods rather than the distance between individual peaks.

The same solution applies to the detection of the relative polarities of the peaks. In accordance with the invention, the step of determining the relative polarities of peaks comprises computing the resemblance of the correlation function in a window around one of said peaks to the correlation function in a window around another one of said peaks, and determining the sign of said resemblance value. If the sign is positive, the two peaks have the same polarity. If the sign is negative, the peaks have opposite polarities.

DESCRIPTION OF EMBODIMENTS

Figure 1:
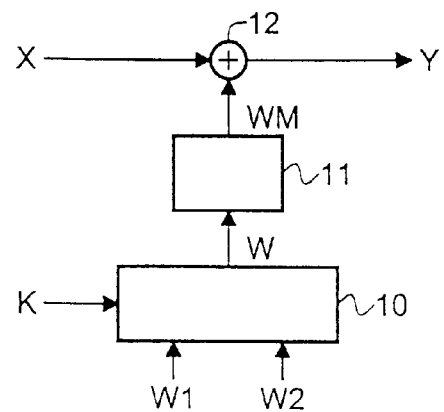
FIG. 1 shows a schematic diagram of a watermark embedder to illustrate how payload data is embedded in a video image.
Figure 2:
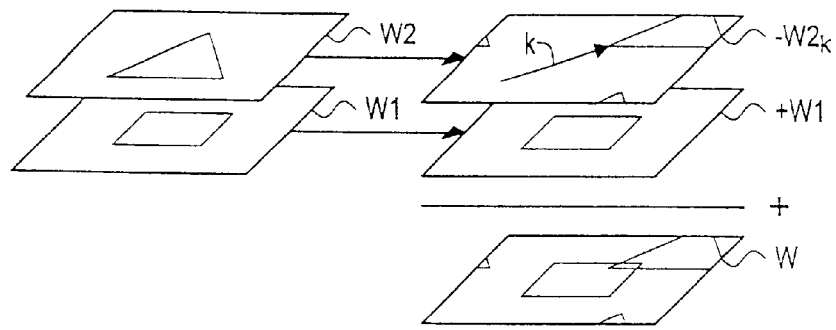
FIGS. 2 and 3 show diagrams to illustrate the operation of the watermark embedder which is shown in FIG. 1.

FIG. 1 shows a schematic diagram of a watermark embedder to illustrate how auxiliary data is embedded in a video image according to the teaching of International Patent Application WO-A-99/45705. The arrangement receives a motion video signal X and outputs a watermarked video signal Y. It comprises a payload encoder 10, a tiling circuit 11, and an adder 12. FIG. 2 illustrates the operation of the payload encoder 10. The encoder receives a limited set of uncorrelated "basic" watermark patterns (W1,W2). Each basic watermark is a given pattern of random noise luminance values, but for convenience it has been given human recognizable contents (a rectangle and a triangle, respectively) in this example.

Figure 3:
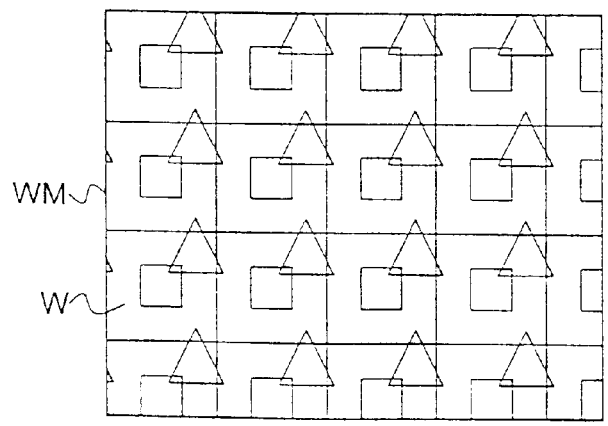

The embedded watermark pattern W is a combination of said basic patterns and/or cyclically shifted versions thereof. In this example, the encoder 10 generates W=W1-W2$_k$, where W2$_k$ is a cyclically shifted version of basic pattern W2. The signs and shift vectors (k) represent payload data K. To reduce complexity, the watermark pattern W has a relatively small size of M×M (e.g. 128×128) pixels. As shown in FIG. 3, it is tiled over the larger image area by the tiling circuit 11. The same watermark WM is subsequently embedded in successive frames of a motion video signal.

Figure 4:
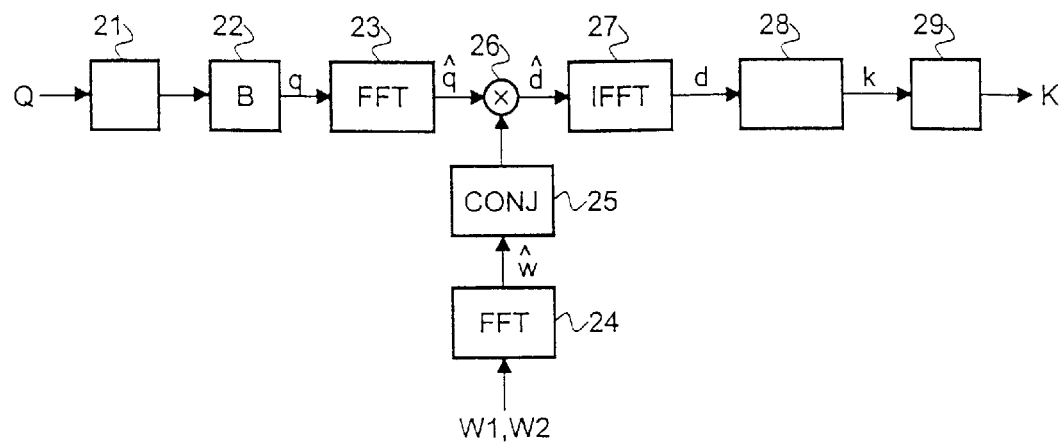
FIG. 4 shows a schematic diagram of an arrangement for detecting payload data in accordance with the invention.

FIG. 4 shows a schematic diagram of the watermark detector in accordance with the invention. The watermark detector receives a possibly watermarked image Q. The image is partitioned (21) into blocks of size M×M (M=128) and all the blocks are stacked (22) in a buffer B of size M×M. This operation is known as folding. To detect whether or not the buffer B includes one or more versions of the watermarks W1 and W2, the buffer contents B and the respective watermark patterns are subjected to correlation. Computing the correlation comprises computing the inner product d=<q, w>of the information signal values q={$q_{ij}$} and the corresponding values w={$w_{ij}$}of the watermark pattern. For the two-dimensional M×M image, the inner product is:

$$d = \frac{1}{M^2} \sum_{i=1}^{M} \sum_{j=1}^{M} q_{ij} w_{ij}.$$

The watermark w is said to be present if the correlation d exceeds a predetermined threshold.

The arrangement, which is shown in FIG. 4, uses the Fast Fourier Transform to simultaneously compute the correlation values d for all possible shifts of the basic watermark w with respect to the image, in accordance with the teachings of International Patent Application WO-A-99/45707. This operation will be briefly summarized. Both the contents q of the buffer B and the basic watermark pattern w are subjected to a Fast Fourier Transform (FFT) in transforming circuits 23 and 24, respectively. These operations yield:

$\hat{q}$=FFT(q) and $\hat{w}$=FFT(w), where $\hat{q}$ and $\hat{w}$ are sets of complex numbers.

Computing the correlation is similar to computing the convolution of q and the conjugate of w. In the transform domain, this corresponds to:

$\hat{d}=\hat{q} \otimes conj(\hat{w})$ where the symbol $\otimes$ denotes pointwise multiplication and conj( ) denotes inverting the sign of the imaginary part of the argument. In FIG. 4, the conjugation of $\hat{w}$ is carried out by a conjugation circuit 25, and the pointwise multiplication is carried out by a multiplier 26. The set of correlation values d is now obtained by inverse Fourier transforming the result of said multiplication:

d=IFFT($\hat{d}$)

which is carried out by an inverse FFT circuit 27.

Figure 5A:
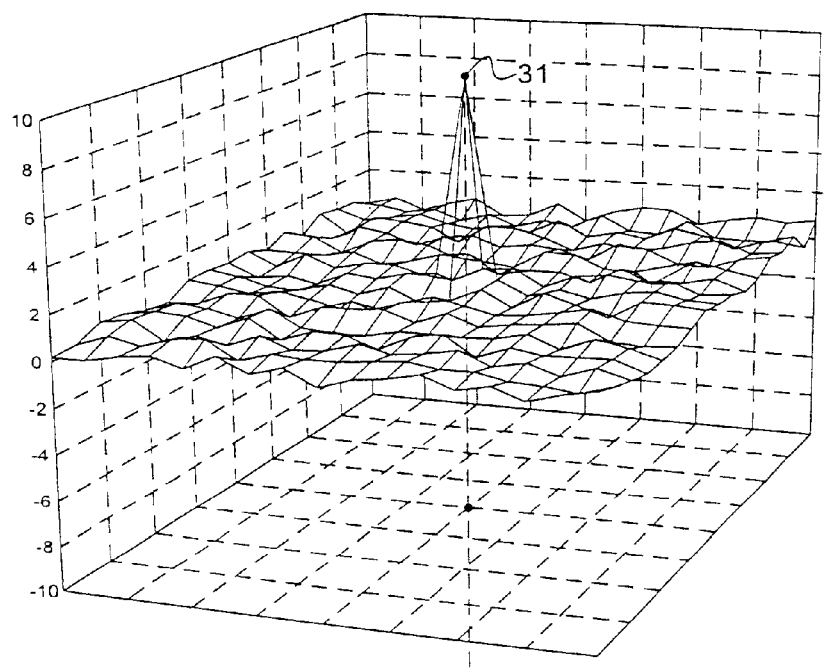
FIGS. 5A and 5B show two-dimensional correlation functions to generally illustrate the operation of the arrangement, which is shown in FIG. 4.
Figure 5B:
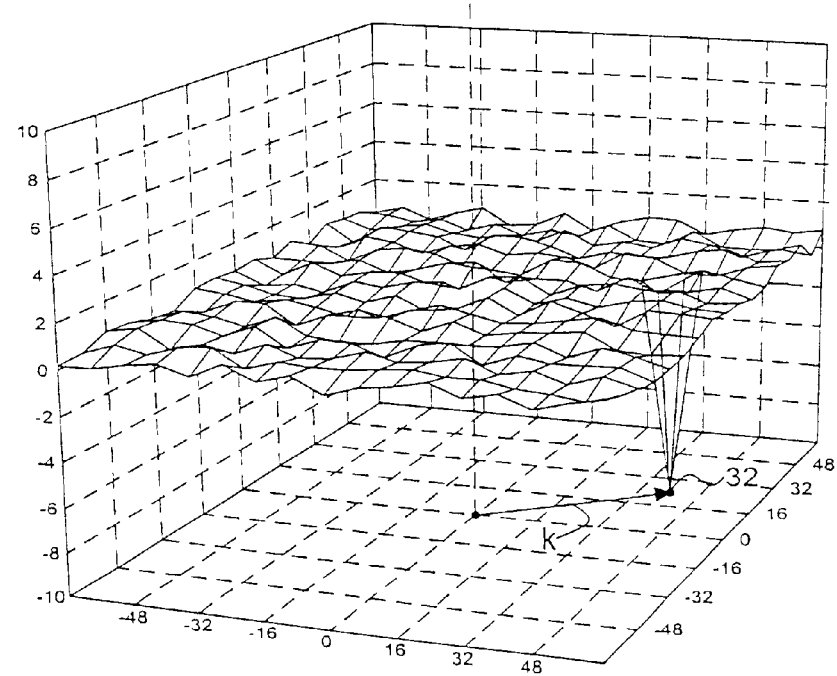

FIG. 5A shows a graph of correlation values if the basic watermark pattern W1 is applied to the detector. The correlation function exhibits a peak 31. The peak has a positive polarity and happens to be located at (0,0) in this example. Note that the absolute location of this peak may be different if the image Q has undergone processing such as translation or cropping. FIG. 5B shows the graph of correlation values if the basic watermark pattern W2 is applied to the detector. The correlation function now exhibits a negative peak 32 at (24,40). The relative position of this peak with respect to the position of peak 31 reveals the relative distance (in pixels) of $W2_k$ with respect to W1, i.e. the shift vector k.

A shift vector retrieving circuit 28 retrieves the shift vector k from the peak patterns in a manner to be described hereinafter. Finally, a payload decoder 29 decodes the embedded payload K from the vector k thus found and the polarities of the peaks.

Figure 6:
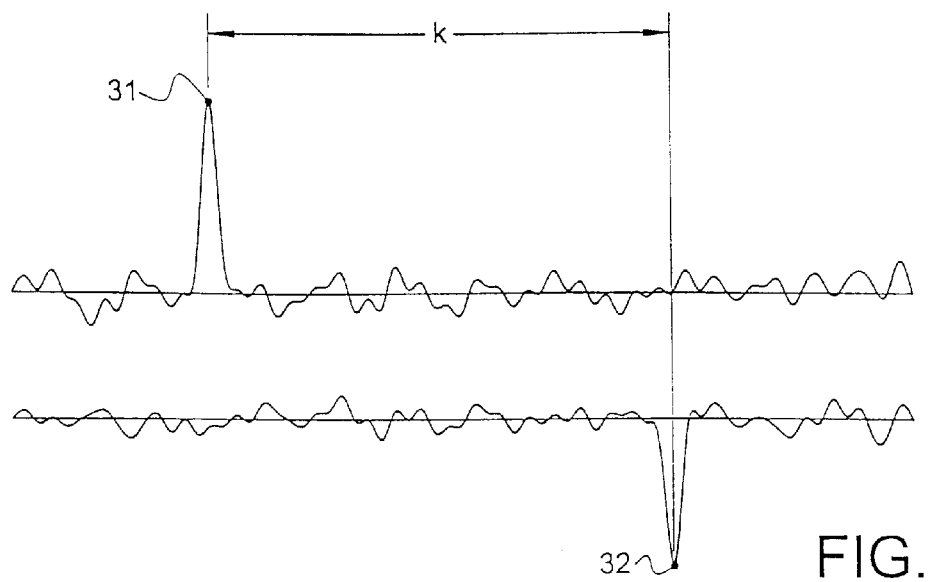
FIG. 6 shows one-dimensional correlation functions to generally illustrate the operation of the arrangement, which is shown in FIG. 4.
Figure 7:
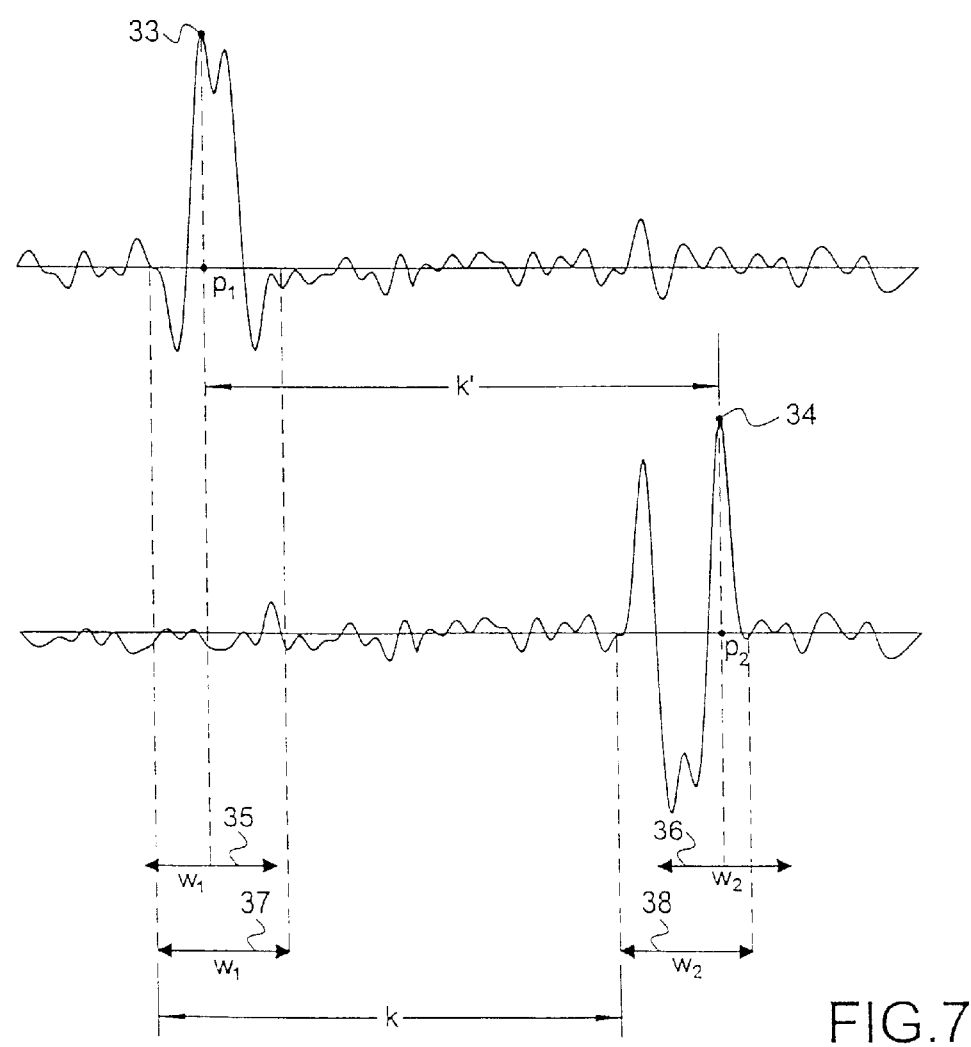
FIG. 7 shows one-dimensional correlation functions to illustrate one embodiment of the method in accordance with the invention.

FIG. 6 shows the correlation functions in the one-dimensional domain for more convenience. The distance k between the peaks 31 and 32 can be precisely retrieved in the ideal case. However, in many practical situations the positions and the polarities of the peaks are not so well defined. Video processing causes the correlation peaks to be smeared. Peaks are broadened, so that the central position is no longer well-defined. Even the sign of a peak may be incorrectly retrieved due to large negative side lobes. This is illustrated in FIG. 7, which shows the correlation functions under sub-ideal conditions. Peaks 33 and 34 have now been detected, at different positions. This phenomenon is referred to as peak jitter. Peak 34 has also the wrong polarity, so that the detector cannot determine the direction of the shift vector. Needless to say that the vector k' in FIG. 7 may lead to erroneous detection of the payload K.

Figure 8:
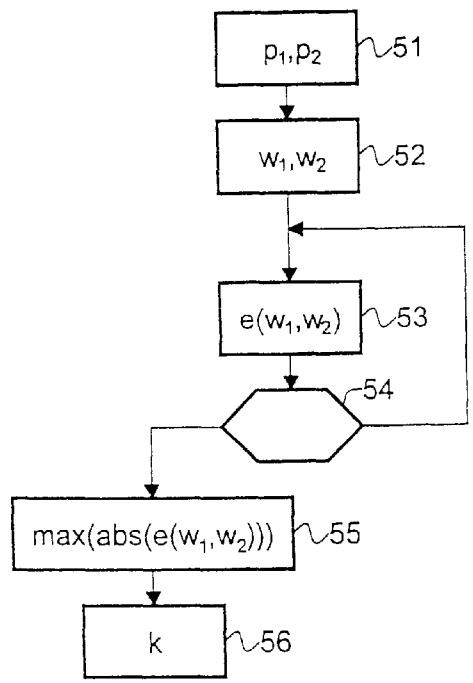
FIGS. 8 and 9 show flow charts of operational steps which are carried out by embodiments of the arrangement in accordance with the invention.

The shift vector retrieving circuit 28 (FIG. 4) is arranged to correctly retrieve the shift vector k, even if the peaks are smeared. The operation of one embodiment of this circuit will now be described with reference to FIG. 8, which shows a flow chart of operational steps:

Step 51: Determine the position $p_1$ of the largest value in abs(B), which is larger than a predetermined threshold T. Determine also the position $p_2$ of the second largest value in abs(B), which does not belong to a suitably chosen neighborhood of $p_1$. The exclusion of an appropriate neighborhood of $p_1$ prevents a large sub-peak of $p_1$ being selected as $p_2$. The threshold T can be set in accordance with the teaching of International Patent Application WO-A-99/45706.

Step 52: Choose a window $w_1$ (35 in FIG. 7), which includes $p_1$, and an equally sized window $w_2$ (36 in FIG. 7), which includes $p_2$. The window may be a rectangle or circle in the case of two-dimensional peak patterns.

Step 53: Determine to which extent the correlation function in $w_1$ and $w_2$ resemble each other. To this end, the circuit computes a match value $e(w_1,w_2)$. Various methods of computing match values are known in the art. A simple correlation is an appropriate choice. The more the waveforms within the windows resemble each other, the larger the absolute value of $e(w_1,w_2)$ will be. The sign of $e(w_1,w_2)$ indicates whether the waveform in window $w_1$ resembles the true or inverted waveform in window $w_2$.

Step 54: Repeat step 53 for all possible positions of windows $w_1$ and/or $w_2$. Note that a cyclic shift has been applied by the embedder. A window exceeding one of the ends of the buffer B must be wrapped around.

Step 55: Determine the largest absolute value of the match value $e(w_1,w_2)$ and its sign.

Step 56: Determine the relative distance between the windows for which abs($e(w_1,w_2)$) is maximal. In FIG. 7, said windows are denoted 37 and 38, respectively. The thus determined distance is the vector k which is looked for.

Figure 9:
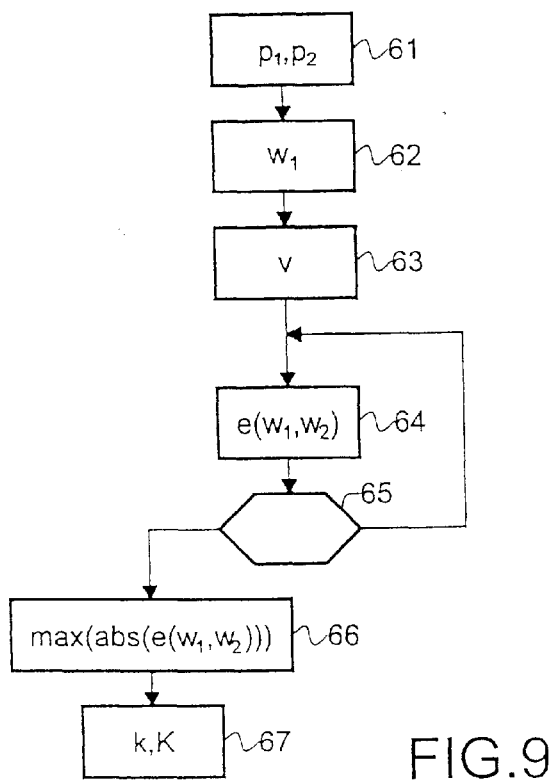

The method described above has some drawbacks. It is computationally expensive, because all possible pairs of windows are evaluated. Furthermore, the geometry and size of the windows are fixed. If the windows are too large, much of the matching is done with samples of the correlation buffer B which are not sub-peaks, but noise samples. If the windows are too small and the peaks are broad, the wrong vector can be extracted. FIG. 9 shows a flow chart of operational steps carried out by another embodiment of the vector retrieving circuit. The operation will now be described with reference to FIG. 10, which shows a top view of two-dimensional spatial correlation functions.

Step 61: Determine two peaks $p_1$ and $p_2$ in buffer B. This step is similar to step 51 in FIG. 8.

Figure 10:
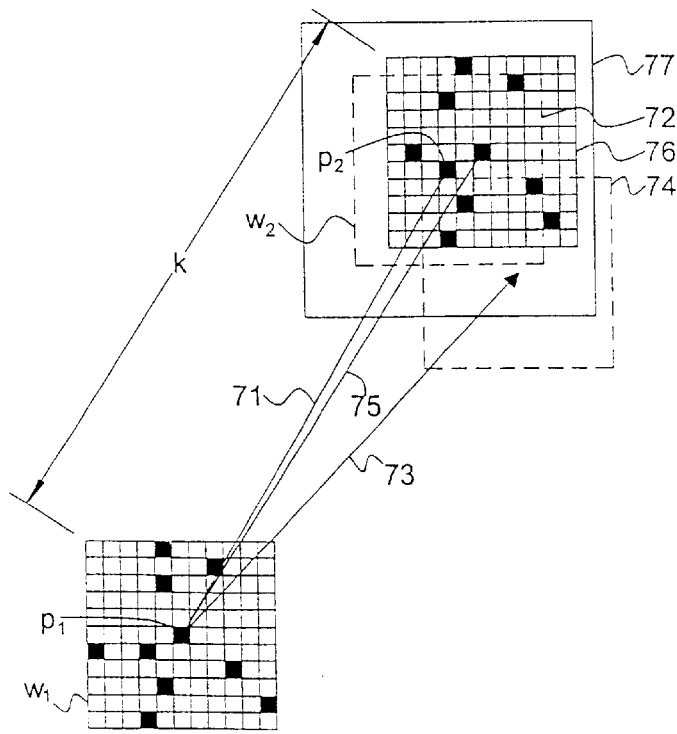
FIG. 10 shows a two-dimensional correlation peak pattern to illustrate a further embodiment of the method in accordance with the invention.

Step 62: Choose a window $w_1$, which consists of local large peaks (larger than a threshold T) in the proximity of $p_1$. In FIG. 10, local peaks are shown as solid pixels.

Step 63: Calculate the vector $v=p_2-p_1$. This vector (71 in FIG. 10) can be considered a first estimate for the vector k looked for.

Step 64: Determine for the vector v the match value $e(w_1, w_2)$ between the correlation patterns in $w_1$ and $w_2$, where $w_2=w_1+v$ (72 in FIG. 10). This step is extremely efficient if the correlation noise for non-peaks in $w_1$ (the white rectangles in FIG. 10) is set to zero.

Step 65: Repeat step 64 for all possible vectors in a proximity of v. In this example, the proximity is a square area 77 of 11×11 pixels around v. One such vector in the proximity of v is denoted 73 and the corresponding window $w_2$ is denoted 74 in FIG. 10.

Step 66: Determine the largest absolute value of the match value $e(w_1,w_2)$ and its sign. In FIG. 10, the vector and window $w_2$ for which the match value is maximal are denoted 75 and 76, respectively. The local peaks in window 76 (shown as solid rectangles) appear to be the best match for the local peaks in window $w_1$.

Step 67: Derive the embedded payload K from the vector k and the sign which are associated to said largest value.

It should further be noted that the payload data may also be represented by the relative polarities of multiple watermarks only. In that case, the detector needs not determine the distance between the most resembling windows $w_1$ and $w_2$, but merely the sign of the match value $e(w_1,w_2)$.

The methods described above look for clusters of peaks and determine the optimal translation to match these clusters. More precisely, having determined a first and second cluster of peaks, a vector v is searched such that the first cluster shifted over v matches the second cluster or its inverse in the best possible way. The outcome of such a matching is a vector v and a sign s, the sign indicating whether or not the clusters have the same or opposite polarity. It has been found that it is difficult to assign an absolute sign to a cluster of peaks. The encoding of payload should therefore better not rely on absolute signs (vectors k and –k should preferably represent the same payload data).

The invention can be summarized as follows. Data is hidden in an information signal by encoding payload in relative positions and/or polarities of multiple (possibly equal) embedded watermarks. The payload is retrieved by computing the correlation between the watermark(s) and the signal as a function of the position. The distance between peaks of the correlation function represents the payload. In order to precisely detect said distance, even if the peaks are smeared, the correlation function in a window ($w_1$) around one peak ($p_1$) is compared with the correlation function in a similar window ($w_2$) around another peak ($p_2$). This is done for different positions of said windows. The distance (k) between the windows (37,38) for which the correlation functions most resemble each other is the distance representing the payload.

What is claimed is:

1. A method of detecting payload data encoded into relative positions of watermarks embedded in a signal, comprising the steps of:

computing a correlation between the watermarks and the signal;

selecting a first window including a first peak of the correlation;

selecting a second window including a second peak of the correlation;

determining a distance between the windows where resemblance between the correlation in the windows is a maximum.

2. The method of claim 1, where the resemblance is calculated by a match value.

3. The method of claim 1, where the resemblance is calculated for a plurality of positions of the first window.

4. The method of claim 1, where the resemblance is calculated for a plurality of positions of the second window.

5. The method of claim 1, where the first and second windows have an equal size.

6. An apparatus for detecting payload data encoded into relative positions of watermarks embedded in a signal, comprising the steps of:

means for computing a correlation between the watermarks and the signal;

means for selecting a first window including a first peak of the correlation;

means for selecting a second window including a second peak of the correlation;

means for determining a distance between the windows where resemblance between the correlation in the windows is a maximum.

7. A method of detecting payload data encoded into relative polarities of watermarks embedded in a signal, comprising the steps of:

computing a correlation between the watermarks and the signal;

selecting a first window including a first peak of the correlation;

selecting a second window including a second peak of the correlation;

calculating a resemblance between the correlation in the first and second windows; and determining the polarity of the resemblance.

8. The method of claim 7, where the resemblance is calculated by a match value.

9. The method of claim 7, where the resemblance is calculated for a plurality of positions of the first window.

10. The method of claim 7, where the resemblance is calculated for a plurality of positions of the second window.

11. The method of claim 7, where the first and second windows have an equal size.

12. The method of claim 7, wherein the polarity is determined for a maximum resemblance between the correlation in the first and second windows.

13. An apparatus for detecting payload data encoded into relative polarities of watermarks embedded in a signal, comprising the steps of:

means for computing a correlation between the watermarks and the signal;

means for selecting a first window including a first peak of the correlation;

means for selecting a second window including a second peak of the correlation;

means for calculating a resemblance between the correlation in the first and second windows; and means for determining the polarity of the resemblance.

* * * * *